United States Patent [19]

Williams

[11] 4,454,267

[45] Jun. 12, 1984

[54] LIGHTWEIGHT JOINT COMPOUND

[75] Inventor: Terrance L. Williams, Crystal Lake, Ill.

[73] Assignee: United States Gypsum Company, Chicago, Ill.

[21] Appl. No.: 450,823

[22] Filed: Dec. 20, 1982

[51] Int. Cl.³ .......................... C08K 3/00; C08K 5/54; C08K 9/04; C08K 9/06
[52] U.S. Cl. ........................................ 524/43; 524/44; 524/47; 524/53; 524/268; 524/423; 524/425; 524/445; 523/209; 523/212
[58] Field of Search ....................... 524/42, 43, 44, 45, 524/47, 53, 423, 425, 445, 268; 523/203, 209, 212, 214; 521/57; 52/741; 106/109–115

[56] References Cited

U.S. PATENT DOCUMENTS

| Re. 29,753 | 9/1978 | Williams | 106/85 |
|---|---|---|---|
| 2,690,594 | 10/1954 | Kirksen | 524/53 |
| 3,321,410 | 5/1967 | MacArthur et al. | 501/85 |
| 3,386,223 | 6/1968 | Wegwerth | 52/741 |
| 3,565,851 | 2/1971 | Neuroth | 523/212 |
| 3,649,588 | 3/1972 | Kennedy-Skipton | 523/212 |
| 3,658,564 | 4/1972 | Gerow et al. | 106/40 |
| 4,287,103 | 9/1981 | Francis et al. | 524/47 |

Primary Examiner—John Kight, III
Assistant Examiner—Nathan M. Nutter
Attorney, Agent, or Firm—Samuel Kurlandsky; Robert H. Robinson; Robert M. Didrick

[57] ABSTRACT

A lightweight joint compound for use in finishing joints between gypsum wallboards, comprising a filler, a binder, a specially treated expanded perlite, a non-leveling agent, and a thickener.

28 Claims, No Drawings

LIGHTWEIGHT JOINT COMPOUND

BACKGROUND OF THE INVENTION

Field of the Invention

The present invention relates to a joint compound for use in filling and coating the joints between adjacent gypsum wallboards, and more particularly refers to a joint compound of the type described which has a lighter weight and better sandability than conventional joint compounds thereby reducing transportation costs, facilitating the handling of containers and application tools and facilitating the final sanding and finishing of the wallboard joints.

In the construction of buildings, one of the most common elements is gypsum wallboard, often known as "drywall," used to construct the walls and/or ceilings. Walls made from gypsum wallboard are conventionally constructed by affixing the panels to studs or joints and filling and coating the joints with a specially prepared adhesive called a "joint compound." This process generally proceeds in the following fashion: a taping grade joint compound is placed within the joint formed by the abutted edges of the wallboards, and a liquid-permeable tape is embedded within the taping compound. When dry (or set), a second coating comprising a topping grade joint compound is applied over the joint. This may be sanded lightly, and then a third coat applied and conventionally finished. Another grade of joint compound is an all-purpose grade which may be used, as the name suggests, both for embedding the tape and for applying as finishing coats. In some instances, a patterned effect is given to the finished wall and joint with the all-purpose joint compound to provide a textured finish.

The primary difference in the past between the various grades of joint compound has been in the differences in the amounts of each ingredient. Thus, no matter what the grade, joint compounds invariably include a filler, and a binder. More binder is used for the taping grade than for the topping grade. Typical fillers may be calcium carbonate, calcium sulfate hemihydrate, or calcium sulfate dihydrate. As is obvious, the choice determines whether the joint compound hardens by drying or by setting. An example of a setting type joint compound is taught in U.S. Pat. No. 3,297,601.

In U.S. Pat. No. Re. 29,753 joint compounds are disclosed which are free of asbestos and utilize attapulgus clay to provide the non-leveling properties previously obtained by the use of asbestos fibers. Conventional compounds with or without attapulgus clay have proven to be excellent. However, they are quite heavy and expensive to transport. Additionally, when the conventional joint compounds dry, they have a hard texture and are difficult to sand in order to provide the joint treatment with a smooth surface. It would be desirable to have a joint compound which is of lighter weight than conventional joint compounds and which, when dry can be readily sanded to provide a smooth surface.

SUMMARY OF THE INVENTION

It is accordingly an object of the present invention to provide a joint compound which is free of asbestos.

It is a further object to provide a joint compound which has the excellent properties such as non-leveling, non-cracking and good adhesion generally required of a joint compound.

It is still further an object to provide a joint compound which is substantially lighter in weight than conventional joint compounds and may be transported at lower costs.

It is still further an object to provide a joint compound of the type described which may be readily sanded to a smooth finish after it has been dried.

It is an additional object to provide a joint compound having non-cracking and excellent adhesive properties.

Other objects and advantages of the invention will become apparent upon reference to the following description.

According to the present invention a joint compound, free of asbestos and having a lighter weight than conventional joint compounds is provided by a formulation which comprises a conventional filler such as calcium carbonate, calcium sulfate dihydrate, or calcium sulfate hemihydrate, a conventional binder such as polyvinyl acetate, a non-leveling and slip providing material such as attapulgus clay, a water retention or thickening agent such as hydroxypropyl methylcellulose, and a specially treated expanded perlite. The presence of the perlite substantially reduces the density of the joint compound and reduces the cost of transportation. Further, when mixed with water the composition provides a joint compound having excellent properties, and which, when dried, can be readily sanded to provide a smooth finish.

The first ingredient of the present lightweight joint compound is expanded and specially treated perlite. Perlite is a form of glassy rock similar to obsidian. It generally contains 65–75% $SiO_2$, 10–20% $Al_2O_3$, 2–5% $H_2O$, and smaller amounts of soda, potash, and lime. When perlite is heated to the softening point, it expands to form a light fluffy material similar to pumice. In preparing the perlite for use in the present invention it is first ground to a size finer than minus 200 mesh. The ground perlite is then heated to a temperature of about 1500° F. This process is carried out in a perlite expander by first heating the air to 1500° F. The finely ground perlite is then introduced into the heated air. As it is carried by the air, it is heated and pops like popcorn. Expanded perlite, is a very lightweight material. However, it contains many fine cracks and fissures, and, when placed in contact with water, the water penetrates the cracks and fissures and enters into the air filled cavities of the perlite, thereby greatly increasing the weight of the particles. Consequently, before utilizing expanded perlite in making joint compounds, it must first be treated to render it water-insensitive. This may be done in one of several different ways. The preferred method is to treat the expanded perlite with a silicone compound which seals off the cracks and fissures. The preferred silicone compound is a water-dilutable emulsion of polydimethyl siloxane. The silicone compound is applied to the expanded perlite by spraying or immersion. The silicone compound is cured at about 300° F. for a period of about 5 minutes. In plant operations, the silicone compound can be applied to the expanded perlite while it is still in the treating chamber and is still hot. The silicone compound will then cure as a result of being raised to an elevated temperature. Other means of rendering perlite water-insensitive are disclosed in U.S. Pat. No. 3,658,564 wherein perlite is rendered water-insensitive by treating the material with sodium or potassium silicate.

The second ingredient of the present invention is a filler. Any common filler disclosed in the art may be utilized. A preferred filler is finely ground calcium carbonate. Other fillers which may be used are calcium sulfate dihydrate and calcium sulfate hemihydrate. In addition, mica, talc, pyrophylite, sericite, diatomaceous earth, and clays such as kaolinite may be used together with the primary fillers.

A third ingredient of the present invention is a non-leveling agent. A preferred non-leveling agent is attapulgus clay. Other non-leveling agents are mixtures of amylopectin starch together with various modified clays in a ratio by weight of 5:1. Still other non-leveling agents which can be used are various bentonites. The non-leveling agents impart certain rheological properties to the joint compound such as thixotropicity. It has been further found that expanded perlite itself contributes to the desirable rheological properties to a considerable degree.

Another material required in a joint compound is a thickener. Among the common thickeners are hydroxypropyl methylcellulose, methylcellulose, hydroxyethylcellulose, hydroxyethyl methylcellulose, and sodium carboxymethylcellulose. The thickeners may be used alone or in combination with one another.

Another ingredient required in a joint compound, particularly one which is a drying compound, is a binder. Among the preferred binders is polyvinyl acetate. Other binders which may be utilized are polyvinyl alcohol, ethylenevinyl acetate co-polymer, vinyl-acrylic co-polymer, styrenebutadiene, other acrylic polymers, and starch.

Additional ingredients generally utilized in joint compounds are preservatives, wetting agents, defoamers, and plasticizers.

EXAMPLES 1-6

In Table I below are shown several formulations of joint compounds which were prepared as Examples 1-6. The joint compounds of Examples 1-6 were prepared in laboratory quantities. In preparing the joint compounds, the binder and preservative were first mixed together with water in a mixing bowl. The dry powder ingredients were then added. The ingredients were first mixed for a short time by hand. They were then put into a Hobart N-50 kitchen mixer. The ingredients were mixed together for 5 minutes, the bowl wiped down, and then mixed together for an additional 10 minutes. Additional water was then added to adjust the viscosity to the desired value. The material was then treated at 15 inches of mercury for about 4 minutes to remove some of the air, and the viscosity was again adjusted and measured. The prepared joint compound was then subjected to various tests for properties required of a joint compound.

TABLE I

| | FORMULATION DRY WEIGHT | | | | | | | | | | | |
|---|---|---|---|---|---|---|---|---|---|---|---|---|
| | Example 1 | | Example 2 | | Example 3 | | Example 4 | | Example 5 | | Example 6 | |
| Silicone Treated Expanded Perlite | 12% | 120 g | 15% | 150 g | 18% | 180 g | 18% | 180 g | 19% | 190 g | 20% | 200 g |
| Attapulgus Clay | 4% | 40 g | 4% | 40 g | 4% | 40 g | 5% | 50 g | 5% | 50 g | 5% | 50 g |
| Hydroxpropyl Methylcellulose | .8% | 8 g | .8% | 8 g | 0.8% | 8 g | .6% | 6.0 g | .6% | 6.0 g | .6% | 6.0 g |
| Calcium Carbonate | 76.2% | 762 g | 73.2% | 732 g | 70.2% | 702 g | 68.4% | 684 g | 67.9% | 679 g | 66.9% | 669 g |
| Polyvinyl Acetate | 7.0% | 117 g | 7.0% | 117 g | 7% | 117 g | 8% | 133 g | 7.5% | 125 g | 7.5% | 125 g |
| Cosan 158 | | 1.0 g | | 1 g | | 1 g | | 1 g | | 1 g | | 1 g |
| Troysan 174 | | 1.0 g | | 1 g | | 1 g | | 1 g | | 1 g | | 1 g |
| Total Water | | 634 cc | | 695 cc | | 735 cc | | 725 cc | | 735 cc | | 740 cc |
| Viscosity | | 410 Bu. | | 400 Bu. | | 410 Bu. | | 430 Bu. | | 440 Bu. | | 470 Bu. |
| Density Lb/Gal. | | 9.16 | | 8.89 | | 8.84 | | 8.45 | | 8.36 | | 7.96 |

Of the trademarked material listed above in Table I, "COSAN 158" is a fungicide marketed and manufactured by the Cosan Chemical Company. "TROYSAN 174" is a preservative manufactured and marketed by the Troy Chemical Company, and is utilized to preserve the containers in which the joint compound is shipped.

All the joint compounds produced in Examples 1-6 were subjected to conventional tests utilized for determining the properties of joint compounds to determine whether they are suitable for such commercial use. Among the properties tested were ease of trowel application, hand sanding properties, cracking and fissure resistance, bonding to a liquid-permeable tape, edge delamination, resistance to deterioration under humid conditions, ease of mechanical sanding, shelf life, and freeze-thaw stability. Each of the joint compounds of Examples 1-6 exhibited excellent properties in all the tests performed. In fact, the joint compounds produced in Examples 1-6 had such excellent adhesion and resistance to crack properties that it was not necessary to utilize mica in the formulation, a material which is conventionally required for use in joint compounds to prevent cracking, and which of course adds to the cost of the finished joint compound.

EXAMPLE 7

A joint compound was prepared in plant quantities and utilizing plant equipment. The plant procedure for preparing the joint compound was similar to that utilized in the laboratory preparations described with regard to Examples 1-6, except that larger equipment was used and larger amounts of each ingredient were used. In carrying out the procedure, water was first charged to a large mixer. The binder and preservatives were then added and mixed together. The mixer was then started and the solid ingredients such as attapulgus clay, calcium carbonate, perlite, and other solid materials were introduced into the top of the mixer. The ingredients were mixed together for about 15 to 20 minutes. At the end of that period additional water was introduced and mixed with the composition for adjusting the viscosity of the joint compound to the desired value. The material was then discharged into containers for transportation. The composition of the joint compound thus prepared is shown below in Table II:

TABLE II

| Example 7 | |
|---|---|
| Silicone Treated Expaned Perlite | 460 lb. |
| Attapulgus Clay | 115 lb. |
| Hydroxypropyl Methylcellulose | 23 lb. |
| Calcium Carbonate | 1550 lb. |
| Polyvinyl Acetate | 392 lb. |

TABLE II-continued

| Example 7 | |
|---|---|
| COSAN 158 | 2 lb. |
| TROYSAN 174 | 2 lb. |
| Total Water | 1361 Gal. |
| Viscosity | 700 Bu. |
| Density (lb./gal.) | 13.97 |

The joint compound produced above was subjected to all the tests enumerated above with respect to Examples 1-6. The joint compound proved to have excellent properties in all of the tests made. The adhesion and non-cracking properties were especially good, even though no mica was utilized in the formulation. The results of the tests indicated that the joint compound of the present invention, particularly as prepared in Example 7, is eminently suitable for commercial use.

Table III below gives the lower and upper limits between which the various ingredients may be used for producing a useful lightweight joint compound according to the invention. The materials are listed in percent by weight of the dry ingredients in the formula. For materials such as emulsion binders or other ingredients supplied as emulsions the water is not included in the percentage, but only the solids content or active portions of the emulsion are set out as constituents.

TABLE III

| | Lower Limit | Upper Limit |
|---|---|---|
| Silicone Treated Perlite | 3.5% | 25% |
| Non-leveling Agent | 0.5% | 7% |
| Thickener | 0.3% | 1.8% |
| Binder | 0.5% | 10% |
| Fillers | 38% | 93% |

The lightweight joint compound of the present invention has many advantages over joint compounds disclosed in the prior art. The greatest advantage is that the material is lighter in weight than conventional joint compounds. Consequently, transporation costs are less. Additionally, because of its light weight, the joint compound can be carried around more easily in buckets, the trowel, or a bazooka and worked with by workmen. When the material of the present invention is utilized, at the end of an eight hour day the workmen are considerably less tired. After the joint compound has been applied and dried, it is much easier to sand than conventional joint compounds. After sanding, a smooth finished wall is obtained. The present joint compound also has a great advantage over conventional joint compounds in that it is lower in shrinkage. Because of this property, it is not necessary to utilize talc or mica, common ingredients utilized in conventional joint compound to prevent cracking. The present joint compound also has very good application properties, generally better than those of conventional joint compounds. The present material has excellent adhesive properties and excellent coating properties. In fact, it has been found that the conventional three coats normally required of a conventional joint compound for covering gypsum board metal corner beads can be reduced to two coats, thereby reducing labor and material costs.

It is to be understood that the invention is not to be limited to the exact details of operation or materials described, as obvious modifications and equivalents will be apparent to one skilled in the art.

Invention is claimed are follows:

1. A lightweight joint compound having properties suitable for use in finishing joints between the edges of adjacent wallboards, said joint compound consisting essentially of:
   (1) a filler selected from the group consisting of calcium carbonate and calcium sulfate,
   (2) a non-leveling agent,
   (3) expanded perlite which has been treated with a silicone compound to render it water-insensitive present in an amount of from about 3.5% to about 25% based on the dry weight of said joint compound,
   (4) a thickener,
   (5) a binder, and
   (6) sufficient water to adjust the viscosity to render said joint compound suitable for use.
2. A lightweight joint compound according to claim 1, wherein said filler is present in an amount from about 38% to about 93% by dry weight of said joint compound.
3. A lightweight joint compound according to claim 2, wherein said filler is calcium carbonate.
4. A lightweight joint compound according to claim 3, wherein said filler is calcium sulfate.
5. A lightweight joint compound according to claim 1, wherein said non-leveling agent is present in an amount of from about 0.5% to about 7% by dry weight of said joint compound.
6. A lightweight joint compound according to claim 5, wherein said non-leveling agent is attapulgus clay.
7. A lightweight joint compound according to claim 5, wherein said non-leveling agent is a mixture of a clay and amylopectin starch in a ratio by weight of about 1:5.
8. A lightweight joint compound according to claim 1, wherein said binder is present in an amount of from about 0.5% to about 10% by dry weight of said joint compound.
9. A lightweight joint compound according to claim 8, wherein said binder is polyvinyl acetate.
10. A lightweight joint compound according to claim 1, wherein said thickener is present in an amount of from about 0.3% to about 1.8%.
11. A lightweight joint compound according to claim 10, wherein said thickener is hydroxypropyl methylcellulose.
12. A lightweight joint compound according to claim 10, wherein said thickener is hydroxyethylcellulose.
13. A lightweight joint compound according to claim 1, which is substantially free of mica.
14. A method of joining the edges of adjacent gypsum wallboard panels which comprises:
   A. applying a lightweight joint compound over said edges consisting essentially of:
      (1) a filler selected from the group consisting of calcium carbonate and calcium sulfate,
      (2) a non-leveling agent,
      (3) expanded perlite treated with a silicone compound to render it water-insensitive, in an amount of from about 3.5% to about 25% of the dry weight of said joint compound,
      (4) a thickener,
      (5) a binder, and
      (6) water,
   B. permitting said joint compound to dry, and
   C. sanding said joint compound to achieve a smooth joint.
15. A method according to claim 14, wherein said filler is present in an amount from about 38% to about 93% by dry weight of said joint compound.

16. A method according to claim 15, wherein said filler is calcium carbonate.

17. A method according to claim 15, wherein said filler is a calcium sulfate.

18. A method according to claim 14, wherein said non-leveling agent is present in an amount of from about 0.5% to about 7% by dry weight of said joint compound.

19. A method according to claim 18, wherein said non-leveling agent is attapulgus clay.

20. A method according to claim 18, wherein said non-leveling agent is a mixture of a clay and amylopectin starch in a ratio by weight of 1:5.

21. A method according to claim 14, wherein said binder is present in an amount of from about 0.5% to about 10% by dry weight of said joint compound.

22. A method according to claim 21, wherein said binder is polyvinyl acetate.

23. A method according to claim 14, wherein said thickener is present in an amount of from about 0.3% to about 1.8%.

24. A method according to claim 23, wherein said thickener is hydroxypropyl methylcellulose.

25. A method according to claim 23, wherein said thickener is hydroxyethylcellulose.

26. A method according to claim 14, wherein said joint compound is substantially free of mica.

27. A lightweight joint compound according to claim 1, wherein said silicone compound is a polydimethyl siloxane.

28. A method according to claim 14, wherein said silicone compound is a polydimethyl siloxane.

* * * * *